United States Patent [19]
Sander

[11] 3,817,065
[45] June 18, 1974

[54] LOC N'BOLT

[76] Inventor: Paul F. Sander, 3366 Park Ave., Wantagh, N.Y. 11793

[22] Filed: Mar. 20, 1973

[21] Appl. No.: 342,929

[52] U.S. Cl. .................................. 70/232, 70/371
[51] Int. Cl. ..................... F16b 41/00, E05b 73/00
[58] Field of Search ............................. 70/58, 232

[56] References Cited
UNITED STATES PATENTS

| 1,625,901 | 4/1927 | Lay | 70/232 |
| 2,345,949 | 4/1944 | Robbins | 70/232 |
| 3,605,460 | 9/1971 | Singer et al. | 70/232 |

Primary Examiner—Albert G. Craig, Jr.
Attorney, Agent, or Firm—Carl Miller

[57] ABSTRACT

An improved locking device for securing portable equipment such as office business machines and factory small machinery and prevent theft thereof; the device consisting of a bolt connecting the equipment to any stationary object, only a bolt head protruding from the equipment or object, and the bolt head being enclosed within a free spinning ball so to prevent an unauthorized person to turn and unscrew the bolt, and a key operated lock being removable from the ball so to expose the screw driver slot on the bolt head so to allow turning and removal of the bolt so to disconnect the equipment from the anchoring stationary object.

1 Claim, 4 Drawing Figures

PATENTED JUN 18 1974 3,817,065
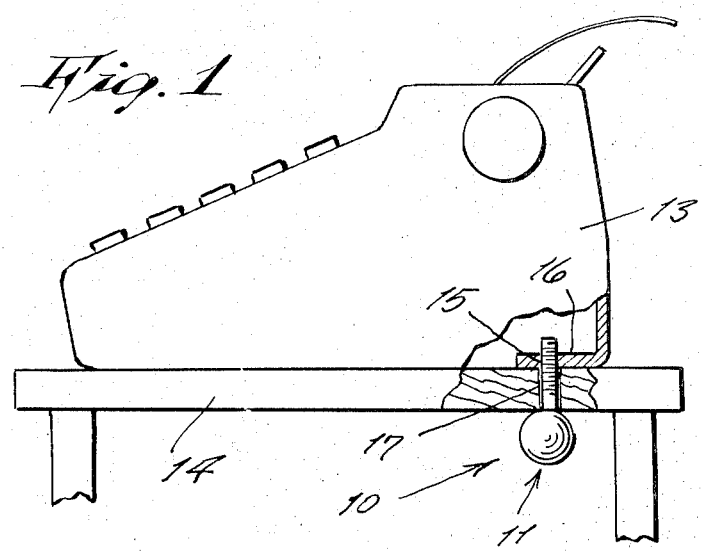
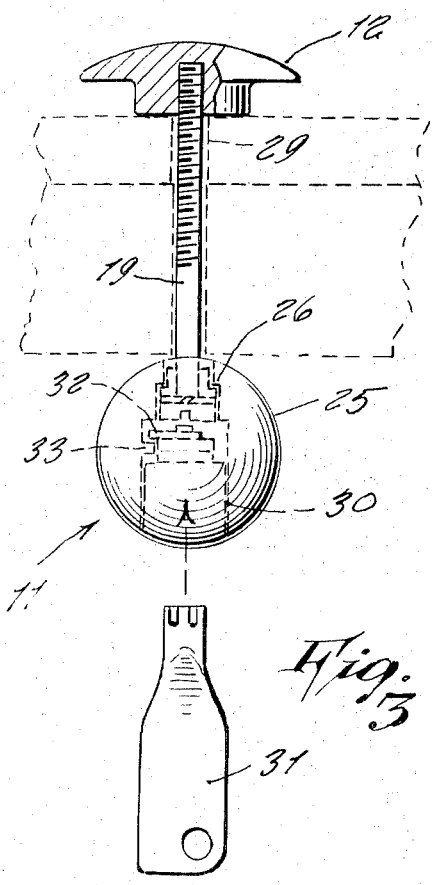
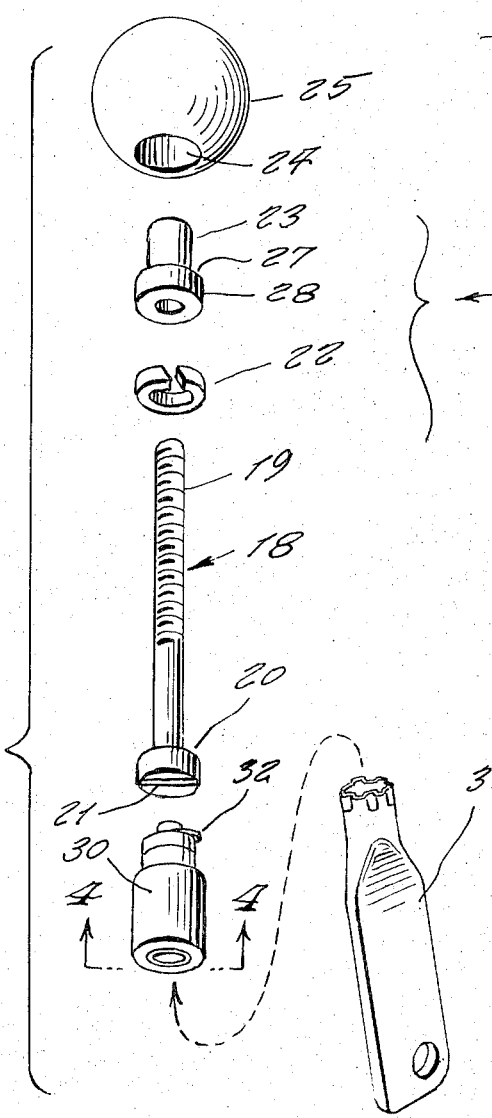

LOC N'BOLT

This invention relates generally to locking devices.

A principal object of the present invention is to provide a locking device designed particularly to secure portable equipment from being lifted and taken away by an unauthorized person so to prevent thievery thereof.

Another object is to provide a locking device that requires only a plain or threaded hole in the equipment to be secured, and a hole in any stationary object to which the equipment is intended to be anchored, so to receive a securing bolt; thus requiring no complicated or large attachments to be installed.

Another object is to provide LOC N'BOLT that is adaptable particularly for securing office typewriters and adding machines, factory small machines and tools, home appliances such as television and radio receivers, and farm equipment such as milling machines, pumps and motors.

Yet another object is to provide a loc n'bolt that is quick and easy to apply and remove by a proper authorized person having a key to unlock the same.

Other objects are to provide a LOC N'BOLT which is simple in design, inexpensive to manufacture, rugged in construction, easy to use and efficient in operation.

Further objects of the invention will appear as the description proceeds.

To the accomplishment of the above and related objects this invention may be embodied in the form illustrated in the accompanying drawings, attention being called to the fact, however, that the drawings are illustrative only, and that changes may be made in the specific construction illustrated and described within the scope of the appended claims.

FIG. 1 is a side view of one form of the invention shown in use.

FIG. 2 is a side view partly in cross-section of a modified design of the invention.

FIG. 3 is an exploded view of the form of the invention that is illustrated in FIG. 1.

FIG. 4 is a view in direction 4—4 of FIG. 3.

Referring now to the drawing in detail, the reference numeral 10 represents a loc n'bolt according to the present invention wherein there is an assembly 11 shown in FIG. 3 that may be used alone for securing an equipment to a stationary object as shown in FIG. 1, or which may be used in conjunction with a cap 12, as shown in FIG. 2.

FIG. 1 illustrates a typewriter 13 that is anchored to a table 14; the typewriter having a threaded opening 15 through the underside of its frame or case 16, and the table having a clearance opening 17 for alignment with the threaded opening 15; the openings 15 and 17 being adaptable to receive the loc n'bolt 10.

The loc n'bolt 10 includes a bolt 18 having a threaded shank 19 for being fitted through the clearance opening 17 and be threadingly engaged in the opening 15, as shown in FIG. 1. The bolt includes an enlarged head 20 at one end, the head having a cross slot 21 for being engaged by a screw driver. The bolt is first inserted through a lock washer 22 for positioning between the bolt head 20 and an end of a collar 23 through which the bolt is next inserted. The bolt is next inserted through a central opening 24 of a spherical ball 25 which like all the other components of the invention is made of a strong steel material. The outer surface of the ball is chrome plated and polished to a smooth finish. The central opening includes a shoulder 26 against which a shoulder 27 of a flange 28 formed on the collar abuts so as to prevent the ball to slip further over the head end of the bolt that is shown in FIG. 2 when thus assembled.

The bolt thus assembled with the lockwasher, collar and ball can then be installed to secure the equipment to an anchoring object by inserting the bolt through the hole 17 and then screwed into opening 15 by means of a screwdriver engaging the bolt head screwdriver cross slot 21. Thus the equipment can be tightly held in place.

If the equipment does not have a threaded opening 15, as shown in FIG. 2, the bolt is passed through a clearance opening 29 of the equipment and the end of the bolt threaded shank is threadingly engaged in the threaded cap 12 positioned thereagainst. It is understood that in instances when the cap is used, such cap is located within the equipment wherein it is not accessible to a prospective thief for being removed, and is therefore hidden or completely unable to be reached. The cap made of strong steel may be coated with an insulation material on its outer surfaces to not mar the equipment finish, or interfer with any electrical parts.

When the bolt is thus secured to the equipment and anchoring object the bolt head will be located deep within the center of the ball so that a space remains for a lock 30 to be inserted flush inside the ball opening 24 and locked therewithin by a removable key 31. The key when turned in the lock causes rotation of an eccentric cam 32 so that in a lock position it gets behind a projection 33 formed on the wall of opening 24, thus preventing the lock to fall out of the opening.

Thus locked, the equipment is safe from theft. If a thief tries to get to the bolt head, the lock prevents it. The ball freely rotates around the bolt so that it cannot be used to unscrew the bolt.

The washer 22 can be placed where indicated in the drawing, or alternately it can be located above the ball 25, as may be desired.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What I claim as new and desire to secure by Letters Patent is:

1. In a loc n'bolt, the combination of an assembly used either with or without a separate internally threaded cap, said assembly comprising a bolt, lockwasher, collar, ball and key operated lock, said bolt securing a portable equipment to a stationary anchoring object, by being inserted through a clearance opening of said object and into an opening of said equipment, said bolt including an enlarged head at one end with a cross slot thereacross, said bolt being first inserted through said lockwasher, then through said collar, and ball successively after which it is fitted through said object opening, and said equipment opening where it is threadingly secured, said bolt head is within a center of an opening through said ball when said bolt locks said equipment and object together, a removable lock being fitted in said ball opening adjacent said bolt head and retained in locked position therewith by a removable key, an outer end of said lock being flush with a spherical surface of said ball, said lock having an eccentric cam which in a locked position is moved behind a projection formed on a wall of said ball opening, said ball being of strong steel, the spherical surface thereof being chrome plated and polished to a smooth finish, and said ball fully enclosing an entire length of said collar whereby said ball abuts directly against said object.

* * * * *